(12) United States Patent
Shirakawa et al.

(10) Patent No.: US 6,848,972 B2
(45) Date of Patent: Feb. 1, 2005

(54) SURFACE MICROMACHINING PROCESS FOR RESIN MOLD

(75) Inventors: Hiroshi Shirakawa, Wako (JP); Kenji Hosoya, Yokohama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/474,140

(22) PCT Filed: Aug. 22, 2002

(86) PCT No.: PCT/JP02/08469

§ 371 (c)(1),
(2), (4) Date: Oct. 2, 2003

(87) PCT Pub. No.: WO03/018281

PCT Pub. Date: Mar. 6, 2003

(65) Prior Publication Data

US 2004/0104505 A1 Jun. 3, 2004

(30) Foreign Application Priority Data

Aug. 23, 2001 (JP) ..................... 2001-253507

(51) Int. Cl.[7] .............................................. B24B 1/00
(52) U.S. Cl. .......................................... 451/29; 451/30
(58) Field of Search .............................. 451/29, 30, 31, 451/445

(56) References Cited

U.S. PATENT DOCUMENTS

| | | | | |
|---|---|---|---|---|
| 4,093,754 A | * | 6/1978 | Parsons | 427/259 |
| 4,828,893 A | * | 5/1989 | Tallman | 428/41.9 |
| 5,435,770 A | * | 7/1995 | Balentine | 451/31 |
| 5,593,528 A | * | 1/1997 | Dings et al. | 156/154 |
| 2003/0034122 A1 | * | 2/2003 | Asai | 156/252 |

FOREIGN PATENT DOCUMENTS

| | | |
|---|---|---|
| JP | 11-320627 | 11/1999 |
| JP | 2001-62843 | 3/2001 |
| JP | 2001-105438 | 4/2001 |

* cited by examiner

*Primary Examiner*—Dung Van Nguyen
(74) *Attorney, Agent, or Firm*—Merchant & Gould, P.C.

(57) ABSTRACT

A surface micromachining process for a resin mold including a layer of a resin as a material of the resin mold, which layer has a product's surface forming plane, and a back surface reinforcing member for reinforcing the resin layer. The product's surface forming plane is micromachined by means of at least two masking/blasting treatments. The treatments comprise a primary blasting step of sticking a first mask sheet having a specific window on the product's surface forming plane and blasting blast particles to the product's surface forming plane via the first mask sheet, and a secondary blasting step of peeling the first mask sheet, sticking a second mask sheet different from the first mask sheet on the product's surface forming plane, and blasting blast particles to the product's surface forming plane via the second mask sheet.

1 Claim, 18 Drawing Sheets

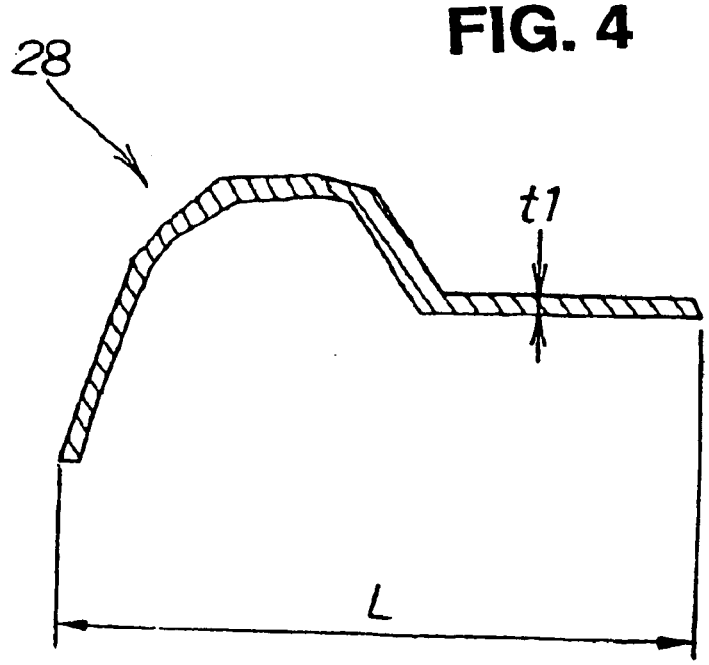
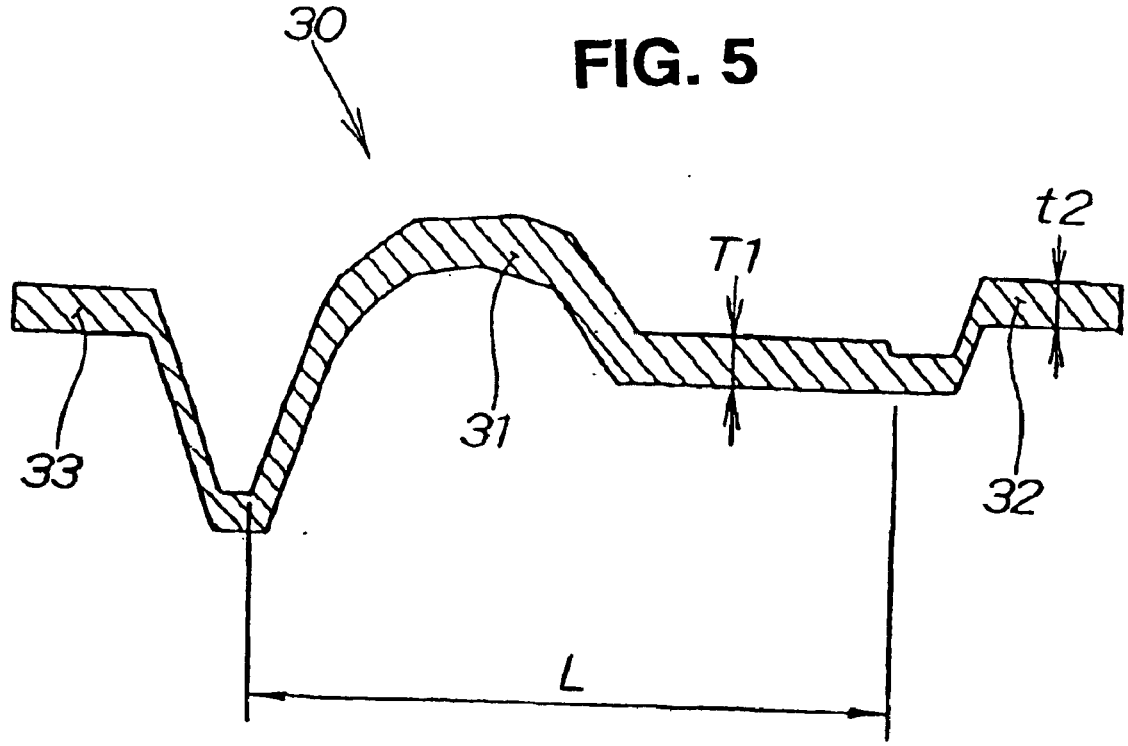

SURFACE MICROMACHINING PROCESS FOR RESIN MOLD

TECHNICAL FIELD

The present invention relates to a surface micromachining process for micromachining a product's surface forming plane of a resin mold.

BACKGROUND ART

As molds used for injection molding resins, there have been mainly used metal molds, and in some cases, for example, for trial production or small-quantity production, there have been used resin molds.

As disclosed in Japanese Patent Laid-Open Publication No. 2001-105438 entitled "Method for Producing Resin Mold", the latter resin molds are characterized in that a plane facing to a cavity, that is, a product's surface forming plane of the resin mold is made from a resin.

An external appearance plane of a resin product such as a handle cover, a luggage box, a fender, or a sheet bottom plate of a two-wheeled vehicle (motorcycle or scooter type vehicle) has come to be regarded as a decorative design plane, and attempts have been made to give a fine pattern to the decorative design plane of the resin product.

FIG. 20 hereof is a bottom view of a sheet bottom plate of a vehicle. If any decorative design pattern is not given to a sheet bottom plate 100, there arises no problem during running of the vehicle because the sheet bottom plate 100 is not viewed from outside; however, there arises a problem when a sheet is raised up for taking a helmet in or out of a luggage box disposed under the sheet because the sheet bottom plate 100 is exposed and thereby become conspicuous. In particular, for a motorcycle of a type in which a sheet is perfectly removable from a vehicular body, the sheet is removed not only for taking a small-sized luggage in or out of a luggage box but also for cleaning and inspecting the luggage box, and in this case, the sheet bottom plate 100 is in a state viewable from outside until next mounting of the sheet. Accordingly, even for the sheet bottom plate 100, it may be desirable to give a decorative design pattern thereto.

For the reason described above, as shown in FIG. 20, a decorative design pattern 101 is given to a bottom plane of the seat bottom plate 100. The decorative design pattern 101 can be selected from various patterns such as a leather-like pattern, a crimp pattern, and a satin-like pattern, and in the example shown in FIG. 20, it is exemplified by a lattice pattern for convenience of easy depiction thereof. The lattice pattern as the decorative design pattern 101 includes lateral grooves and longitudinal grooves, and in order to enhance the decorative design characteristic, the lateral grooves of the lattice pattern are taken as deep grooves 102 . . . (symbol ". . ." denotes a plural number, the same applying in the following), and the longitudinal grooves of the lattice pattern are taken as shallow grooves 103 . . . .

FIG. 21 is a sectional view taken on line 21—21 of FIG. 20, showing a state that the deep grooves 102 . . . and the shallow grooves 103 . . . perpendicular thereto are formed in the sheet bottom plate 100. To form a lattice pattern having lateral and longitudinal grooves different in depth from each other as described above, a mold is required to have the following product's surface forming plane.

FIG. 22 is a perspective view of a product's surface forming plane of a mold. To form a lattice pattern on a sheet bottom plate, a reversal pattern composed of projection ribs 107 (height: h1) for forming deep grooves and projecting ribs 108 (height: h2, h2<h1) for forming shallow grooves is required to be engraved in a product's surface forming plane 106 of a mold 105.

If the mold 105 is configured as a metal mold, the above-described reversal pattern can be easily formed on the product's surface forming plate by NC machining, electric charge machining, or etching.

If the mold 105 is configured as a resin mold, however, the above-described reversal pattern cannot be obtained by NC machining, electric charge machining, or etching. To be more specific, the use of NC machining for micromachining the resin mold has a problem that since a resin of the resin mold is melted by cutting heat, it fails to engrave a sharp reversal pattern in the resin mold, and since a resin of the resin mold is an insulator and has a resistance against chemicals, neither electric discharge machining nor etching is used for micromachining the resin mold. Accordingly, a resin mold used as an easy-to-use mold has been not subjected to micromachining.

Resin molds for small-quantity production, however, are required to give patterns to resin products, and therefore, it is required to establish a surface micromachining technology for resin molds.

DISCLOSURE OF THE INVENTION

To meet the above-described requirement, according to the present invention, there is provided a surface micromachining process for a resin mold including a layer of a resin as a material of the resin mold, which layer has a product's surface forming plane, and a back surface reinforcing member for reinforcing the resin layer. The process is characterized in that the product's surface forming plane is micromachined by means of at least two masking/blasting treatments. The treatments includes a primary blasting step of sticking a first mask sheet having a specific window on the product's surface forming plane and blasting blast particles to the product's surface forming plane via the first mask sheet, and a secondary blasting step of peeling the first mask sheet, sticking a second mask sheet different from the first mask sheet on the product's surface forming plane, and blasting blast particles to the product's surface forming plane via the second mask sheet.

With this configuration, the product's surface forming plane of the resin mold is ground by blasting blast particles to the product's surface forming plane at a high speed. Since the surface micromachining of the resin mold is performed by using the blasting process, it is possible to solve a problem that a resin of the resin mold is melted, which problem has arisen in the case of using the NC machining process.

Further, by sequentially using the first and second mask sheets different in kind in the surface micromachining process, a reversal pattern with its components different from each other in height or depth can be engraved in the product's surface forming plane of the resin mold.

The resin as a material of the resin mold is specified as an epoxy resin composition adapted for a tool, wherein the epoxy resin composition contains at least an epoxy resin, a powder of metal, and aramid fibers.

The epoxy resin composition adapted for a tool has a higher hardness and a higher durability as compared with ordinary resins, and therefore, by forming the resin mold by using the resin having such a composition, it is possible to significantly increase the molding number of the resin mold.

BRIEF DESCRIPTION OF THE DRAWINGS

FIG. 4 is a sectional view of a sheet bottom plate to which the present invention is applied;

FIG. 5 is a sectional view of a master model used for the present invention;

BEST MODE FOR CARRYING OUT THE INVENTION

Hereinafter, embodiments of the present invention will be described with reference to the accompanying drawings. It is to be noted that prior to description of a surface micromachining process for a resin mold, a method of producing a resin mold, which method is the premise of the surface micromachining process, will be described first.

Figure 1:
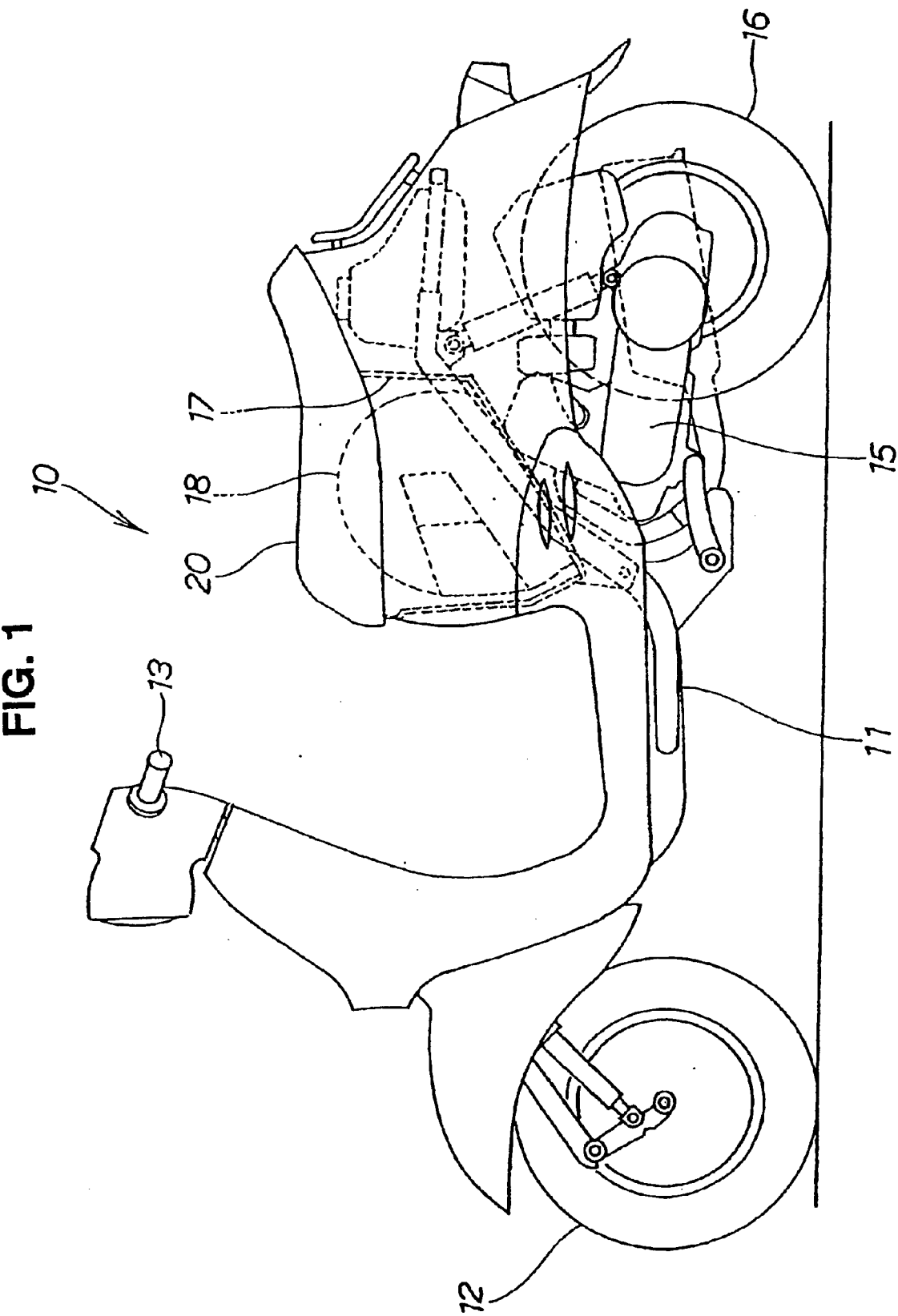
FIG. 1 is a side view of a scooter type motorcycle to which the present invention is applied.

FIG. 1 is a side view of a scooter type motorcycle to which the present invention is applied. A scooter type motorcycle 10 is a vehicle including a body frame 11. A front wheel 12 and a handlebar 13 are provided on a front portion of the body frame 11. A rear wheel 16 is provided, via a swing type power unit 15, on a rear portion of the body frame 11. A luggage box 17 and a seat 20 are provided nearly above the rear wheel 16. The luggage box 17 is a large-sized housing box capable of housing a helmet 18, wherein the helmet 18 is taken in or out of the luggage box 17 by opening the seat 20.

Figure 2:
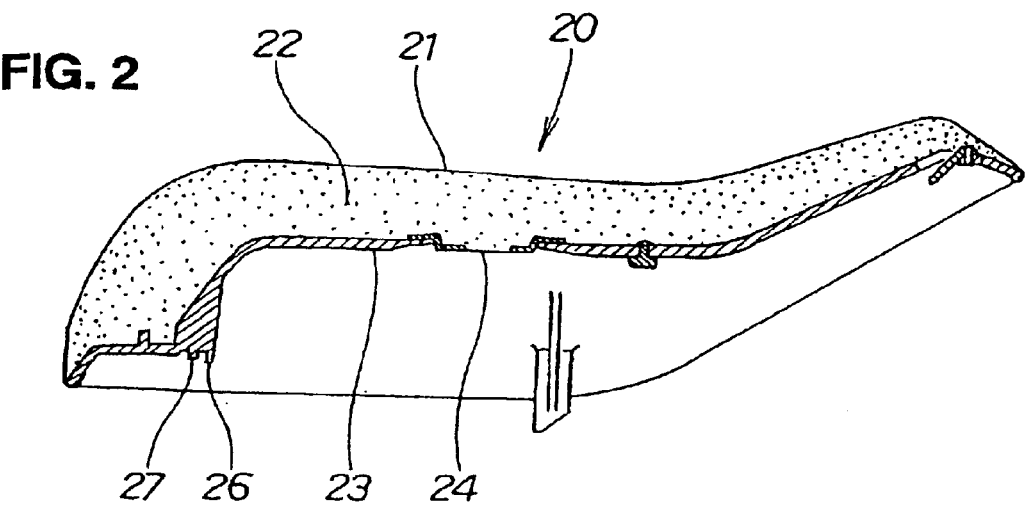
FIG. 2 is a sectional view of a sheet to which the present invention is applied.

FIG. 2 is a sectional view of the seat to which the present invention is applied. The seat 20 includes a skin 21, a cushion member 22 made from sponge, and a seat bottom plate 23 formed by a resin-molded product. The seat bottom plate 23 is a rigid member for receiving the body weight of a driver via the cushion member 22 and the skin 21.

Figure 3:
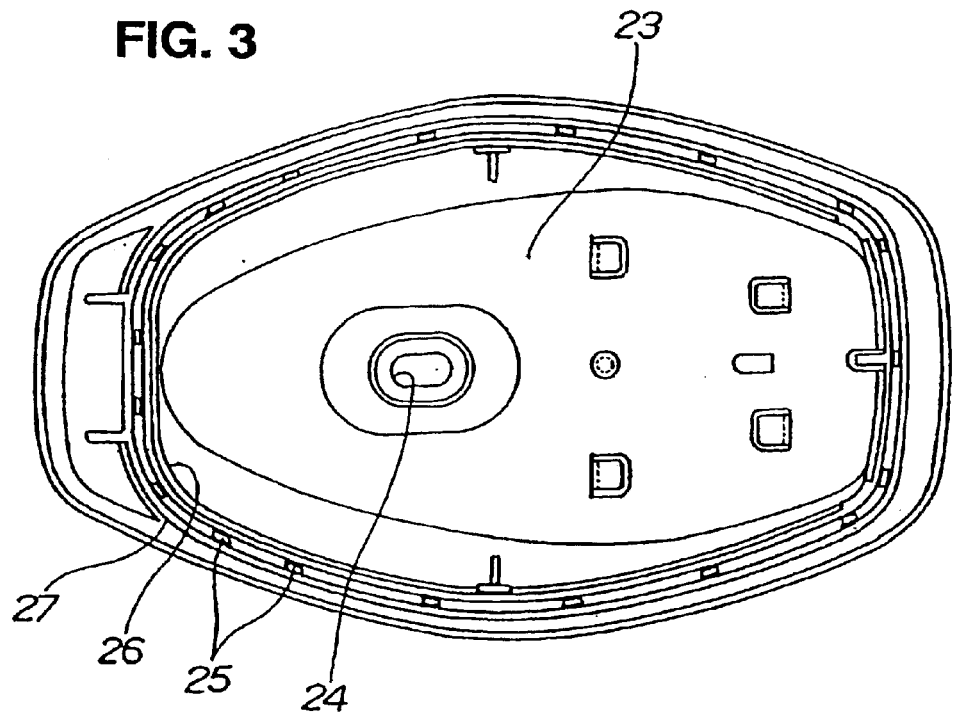
FIG. 3 is a bottom view of the sheet to which the present invention is applied.

FIG. 3 is a bottom plate of the sheet to which the present invention is applied. The sheet bottom plate 23 is a member formed into a complicated, approximately elliptic shape including a helmet holder 24, a plurality of through-holes 25 . . . (symbol ". . . " denotes a plural number, the same applying in the following) and projecting rib portions 26 and 27 formed to surround the through-holes 25 . . . . The sheet bottom plate 23 is produced by a resin-molding process using a mold.

FIG. 4 is a sectional view of the sheet bottom plate to which the present invention is applied. It is to be noted that a cross-sectional shape of a sheet bottom plate shown in this figure is depicted more simply than that of the sheet bottom plate 23 shown in FIG. 2 for convenience of description, and therefore, the sheet bottom plate in this figure is newly denoted by reference numeral 28. The overall length of the sheet bottom plate 28 is taken as L, and a representative thickness thereof is taken as t1.

FIG. 5 is a sectional view of a master model used for the present invention. A master model 30 is a model having such a cross-section that two clamping lug portions 32 and 33 are protruded from both ends of a model portion 31 having a length of L.

Letting the thickness of the clamping lug portion 32 be t2, the total of the thickness t1 shown in FIG. 4 and the thickness t2 becomes a representative thickness T1 of the model portion 31. Accordingly, the master model 30 is larger than the sheet bottom plate 2B shown in FIG. 4.

A preferable master model 30 is a resin model produced by a rapid prototyping process. The rapid prototyping process is advantageous in producing a model for a short time. The master model 30, however, may be produced by any other production process. Alternatively, the master model 30 may be made from a material other than a resin, for example, a light metal.

A method of producing a resin mold using the master model 30 will be described below.

Figure 6:
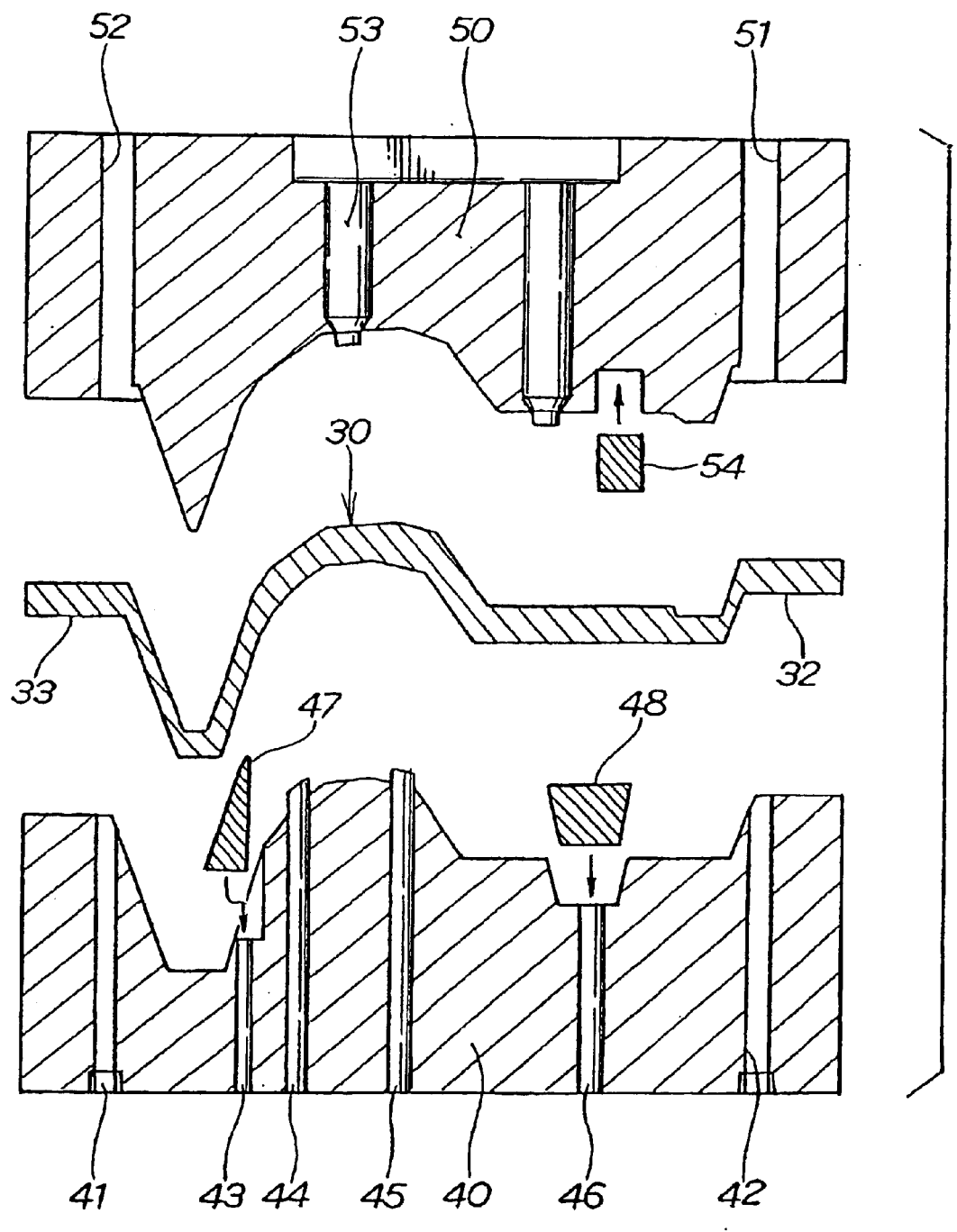
FIG. 6 is a view illustrating a preparation step according to the present invention.

FIG. 6 is a view illustrating a preparation step according to the present invention. In this step, a first back surface reinforcing member 40 is prepared. The first back surface reinforcing member 40 includes a temporary filler injection hole/resin injection hole 41, a temporary filler overflow hole/rein overflow hole 42, various ejector pins 43, 44, 45, and 46, and inserts 47 and 48.

The first back surface reinforcing member 40 is preferably made from an aluminum-copper based zinc alloy called ZAS, ZAC, or AZ4 (each of which is a registered trade name). An aluminum-copper based zinc alloy containing 4.1 wt % of aluminum, 3.0 wt % of copper, and 0.04 wt % of magnesium, the balance being zinc has a Vickers hardness (hereinafter, abbreviated as Hv) of about 100 kg/mm$^2$, which is as large as about two times or more the hardness (Hv: 43 kg/mm$^2$) of an epoxy resin.

The hardness of a cast iron (FC300), which has been generally used for a back surface reinforcing member, is as large as Hv=about 240 kg/mm$^2$; however, since a melting point of the cast iron is as high as 1300° C. or more, high temperature works are required for melting and casting the cast iron. On the contrary, since the above-described aluminum-copper based zinc alloy has a melting point being as low as about 380° C., the alloy can be very easily cast.

In this way, the above-described aluminum-copper based zinc alloy typically called ZAS advantageously has both a suitable hardness (rigidity) and a low melting point.

In the step shown in FIG. 6, a second back surface reinforcing member 50 is then prepared. The second back surface reinforcing member 50 includes a resin injection hole 51, a resin overflow hole 52, a sprue bush 53, and an insert 54. The second back surface reinforcing member 50 is also preferably made from the above-described aluminum-copper based zinc alloy typically called ZAS.

In the step shown in FIG. 6, the master model 30 having the shape corresponding to that of a product and including the clamping lug portions 32 and 33, and the first back surface reinforcing member 40 and the second back surface reinforcing member 50 are thus prepared.

Figure 7:
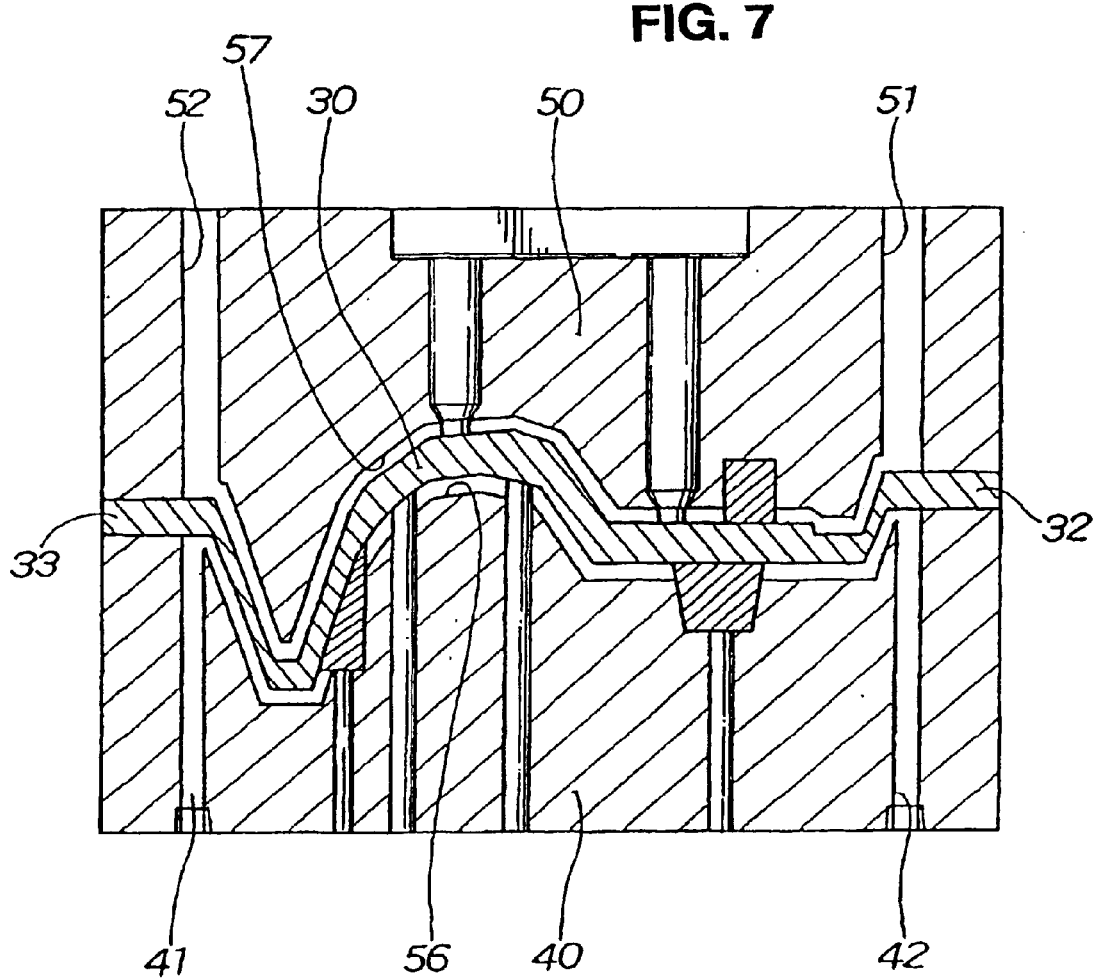
FIG. 7 illustrates a master model clamping step according to the present invention.

FIG. 7 is a view illustrating a master model clamping step according to the present invention. In this step, the master model 30 is clamped between the first back surface reinforcing member 40 and the second back surface reinforcing member 50. Here, it is important that a first resin filling space 56 having a specific thickness is put between the master model 30 and the first back surface reinforcing member 40 and a second resin filling space 57 having a specific thickness is put between the master model 30 and the second back surface reinforcing member 50.

As a result of setting the first and second resin filling spaces 56 and 57, only the clamping lug portions 32 and 33 of the master model 30 are clamped between the first and second back surface reinforcing members 40 and 50.

Figure 8:
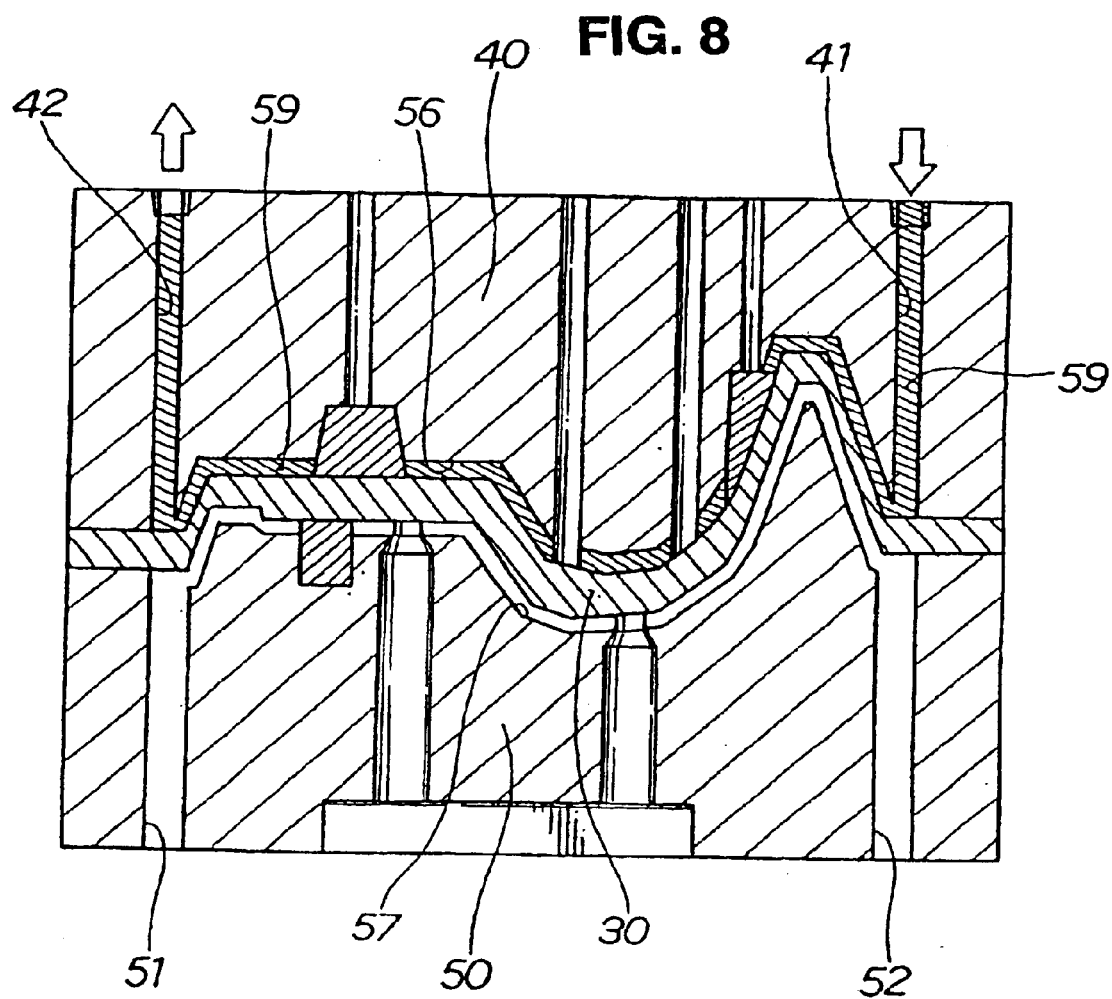
FIG. 8 is a view illustrating a temporary filler filling step according to the present invention.

FIG. 8 is a view illustrating a temporary filler filling step according to the present invention. In this step, the assembled body shown in FIG. 7 is reversed such that the first back surface reinforcing member 40 is positioned on the upper side and the second back surface reinforcing member 50 is positioned on the lower side. A temporary filler 59 such as beads, silicon based clay, or a resin is injected in the first resin filing space 56 from the temporary filler injection hole/resin injection hole 41 provided in the first back surface reinforcing member 40. When the temporary filler 59 overflows from the temporary filler overflow hole/resin overflow hole 42, the injection of the temporary filler 59 is stopped. A plug (not shown) is screwed or pressed in each of the temporary filler injection hole/resin injection hole 41 and the temporary filler overflow hole/resin overflow hole 42, to enclose the temporary filler 59 in the first resin filling space 56.

Figure 9:
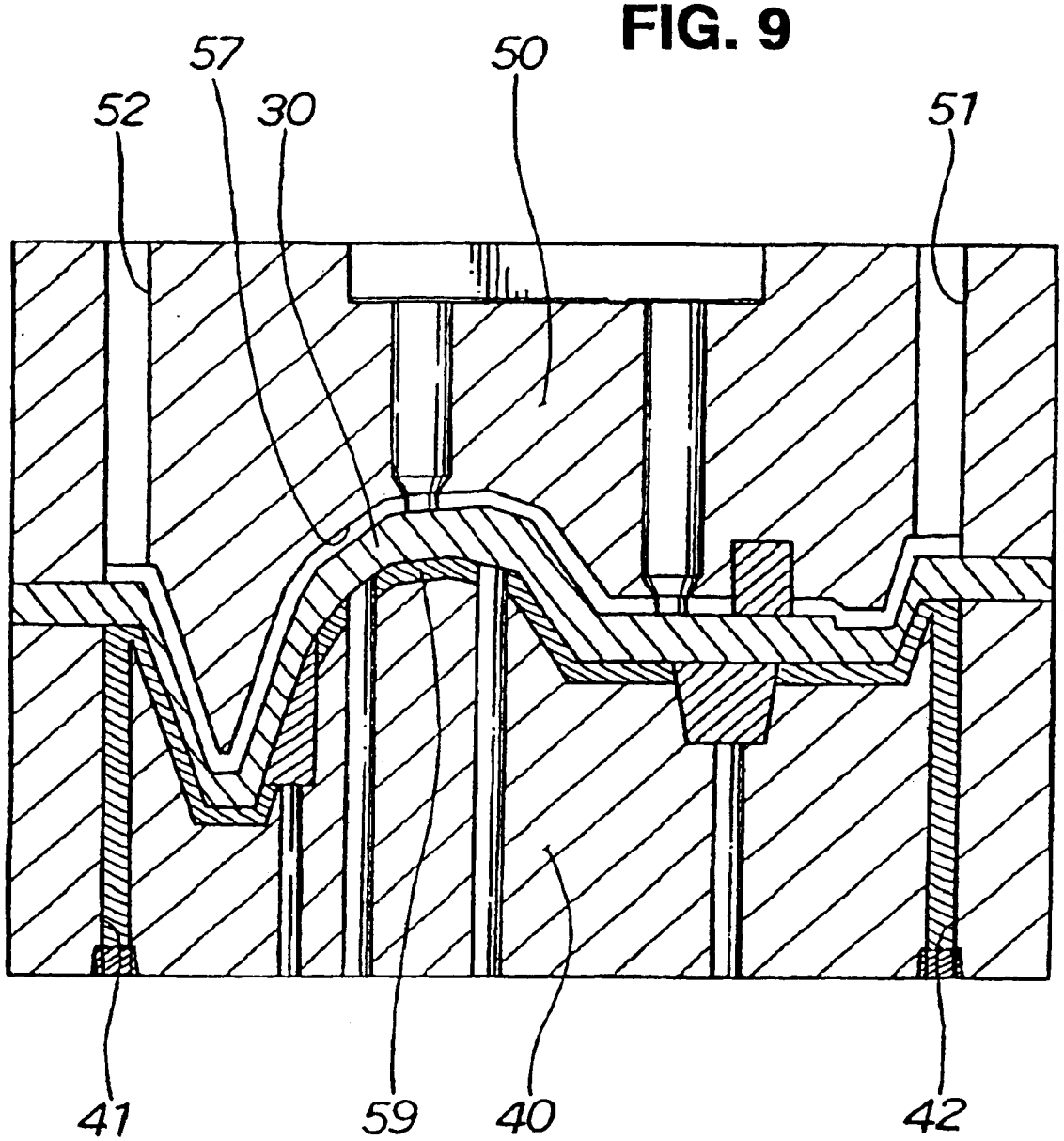
FIG. 9 is a view showing reversal of an assembled body according to the present invention.

FIG. 9 is a view showing reversal of the assembled body according to the present invention. As shown in this figure, the assembled body shown in FIG. 8 is reversed such that the temporary filler 59 is positioned on the lower side and the second resin filling space 57 is positioned on the upper side.

Figure 10:
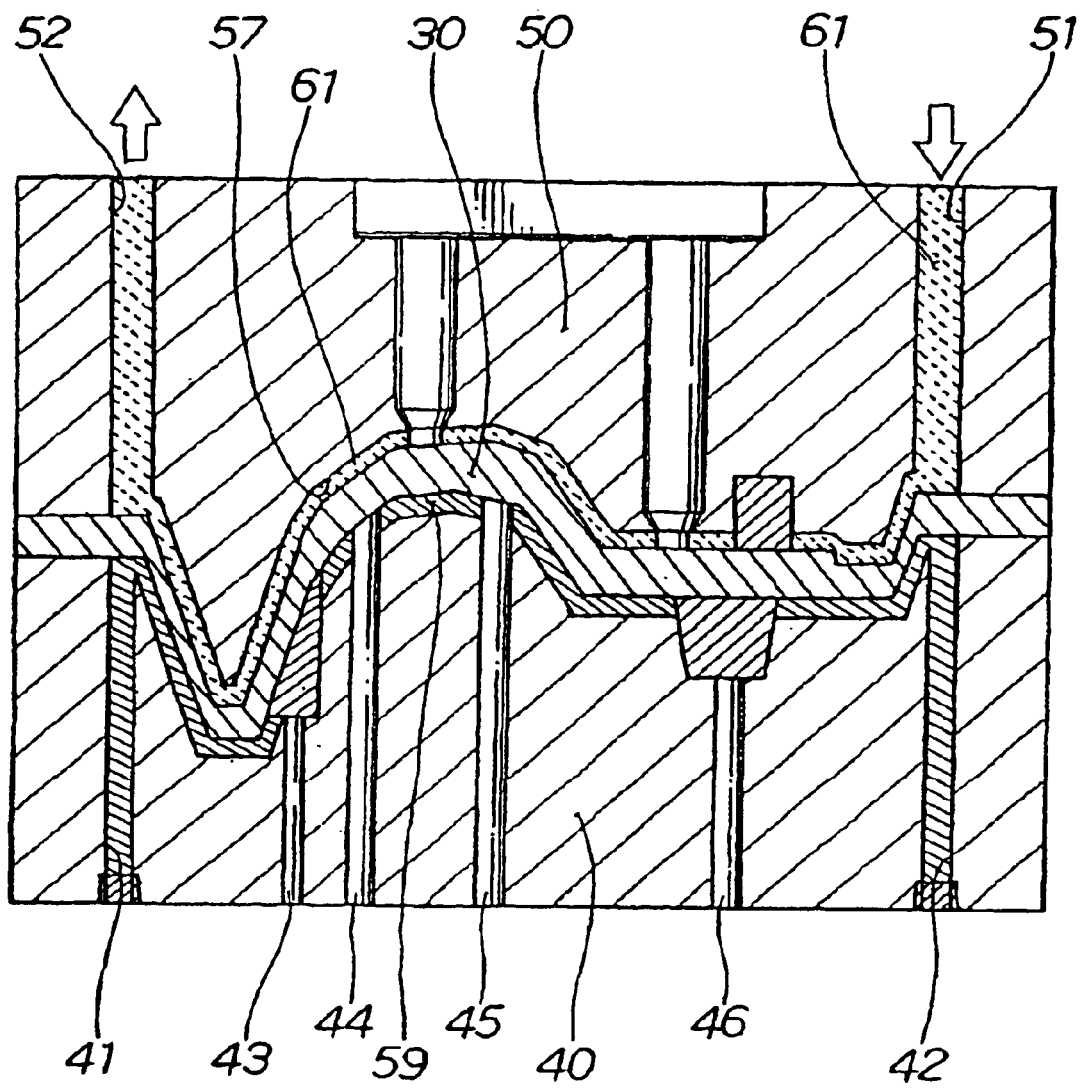
FIG. 10 is a view illustrating a resin filling step according to the present invention, in which a second resin filling space is filled with a resin as a material of a resin mold to be produced.

FIG. 10 is a view illustrating a resin filling step according to the present invention, in which the second resin filling space is filled with a resin as a material of a resin mold to be produced. In this step, a resin 61 as a material of a resin mold to be produced, which resin contains an epoxy resin and a powder of metal as basic components and also contains a filler as an additional component, is injected in the second resin filling space 57 from the resin injection hole 51 provided in the second back surface reinforcing member 50. When the resin 61 overflows from the resin overflow hole 52, the injection of the resin 61 is stopped, followed by curing the resin 61.

The powder of a metal contained in the resin 61 may be a powder of a metal such as aluminum, copper, iron, or nickel, or a powder of an alloy containing the metal as a main component.

The filler contained in the resin 61 is basically used in the form of fibers, and the material of the filler may be carbon, aramid resin, polyimide, a ceramic material, a metal material, or a material equivalent thereto.

During the above-described operation of the resin filling step, since a downward load equivalent to a total of a weight of the resin 61 injected in the second resin filling space 57 and the injection pressure is applied to the master model 30, there is a possibility that the master model 30 be deflected downwardly; however, in actual, since the back surface of the master model 30 is overall supported by the temporary filler 59, the master model 30 is not deflected downwardly.

As a result, during the operation of the resin filling step, the thickness of the second resin filling space 57 does not extend, so that the thickness of a layer of the resin 61 injected in the second resin filling space 57 can be set to a specific thickness.

Figure 11:
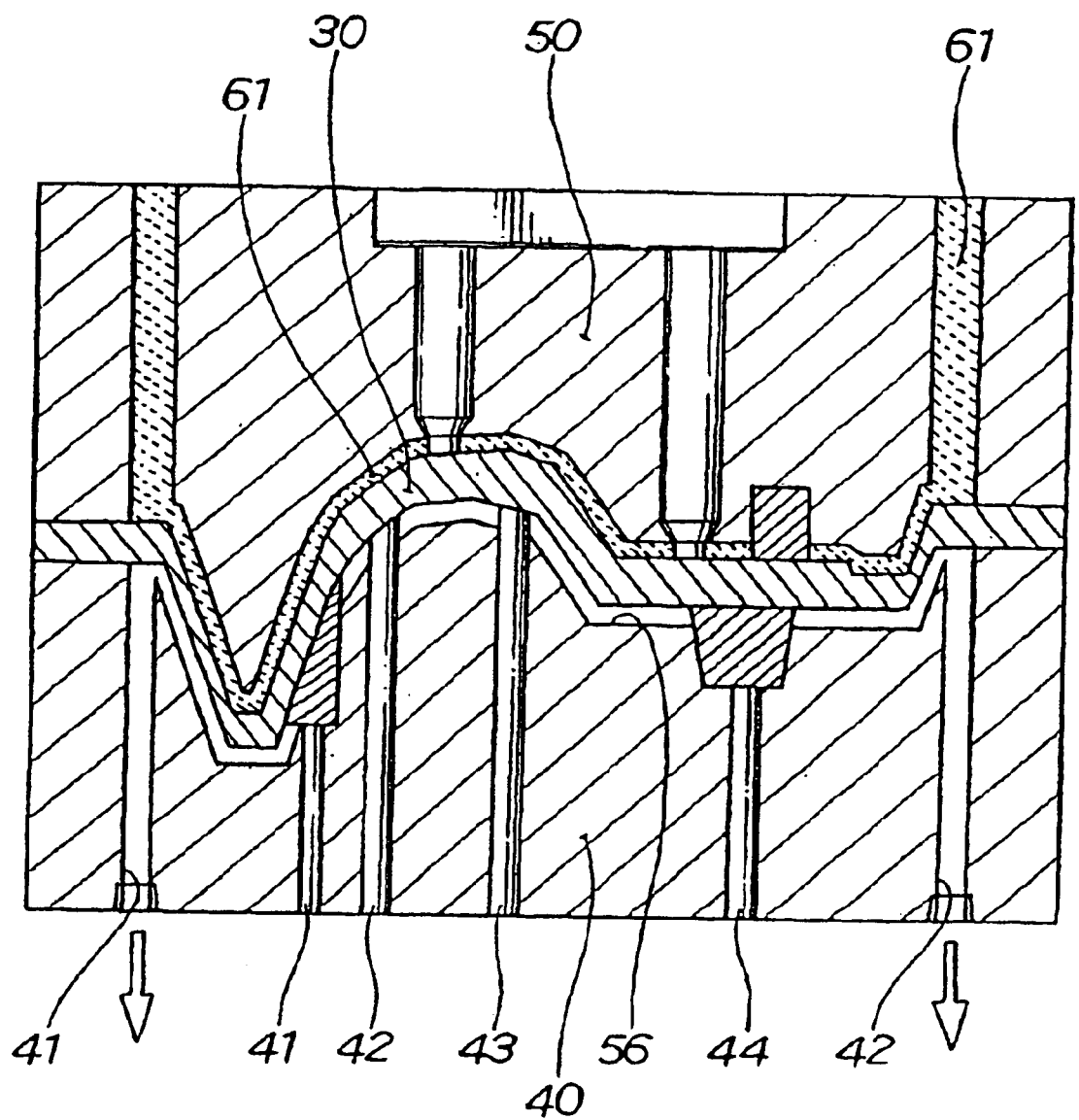
FIG. 11 is a view illustrating a temporary filler discharging step according to the present invention.

FIG. 11 is a view illustrating a temporary filler discharging step according to the present invention. In this step, the temporary filler 59 (see FIG. 10) is discharged from the first resin filling space 56 by removing the plugs (not shown). Concretely, if the temporary filler 59 is in the form of beads, it may be discharged by tilting the assembled body while imparting a mechanical vibration thereto, and if the temporary filler 59 is in the form of a thermally-fluidized material, it may be discharged by tilting the assembled body while heating the first back surface reinforcing member 40.

Figure 12:
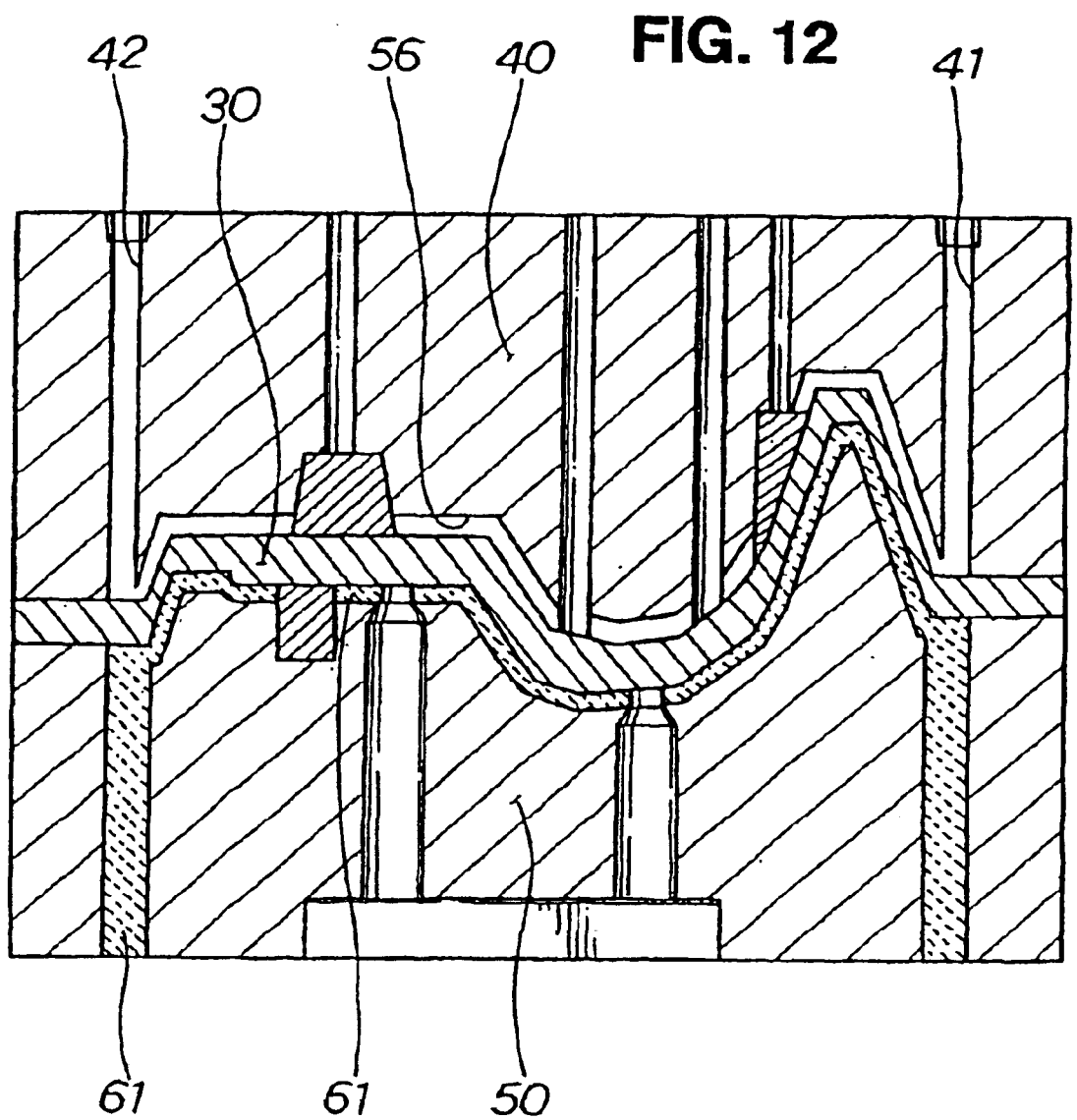
FIG. 12 is a view showing further reversal of the assembled body according to the present invention.

FIG. 12 is a view showing further reversal of the assembled body according to the present invention. As shown in this figure, the assembled body shown in FIG. 11 is reversed such that the first resin filling space 56 is positioned on the upper side and the layer of the resin 61, which has been injected to fill the second resin filling space 57, is positioned on the lower side.

Figure 13:
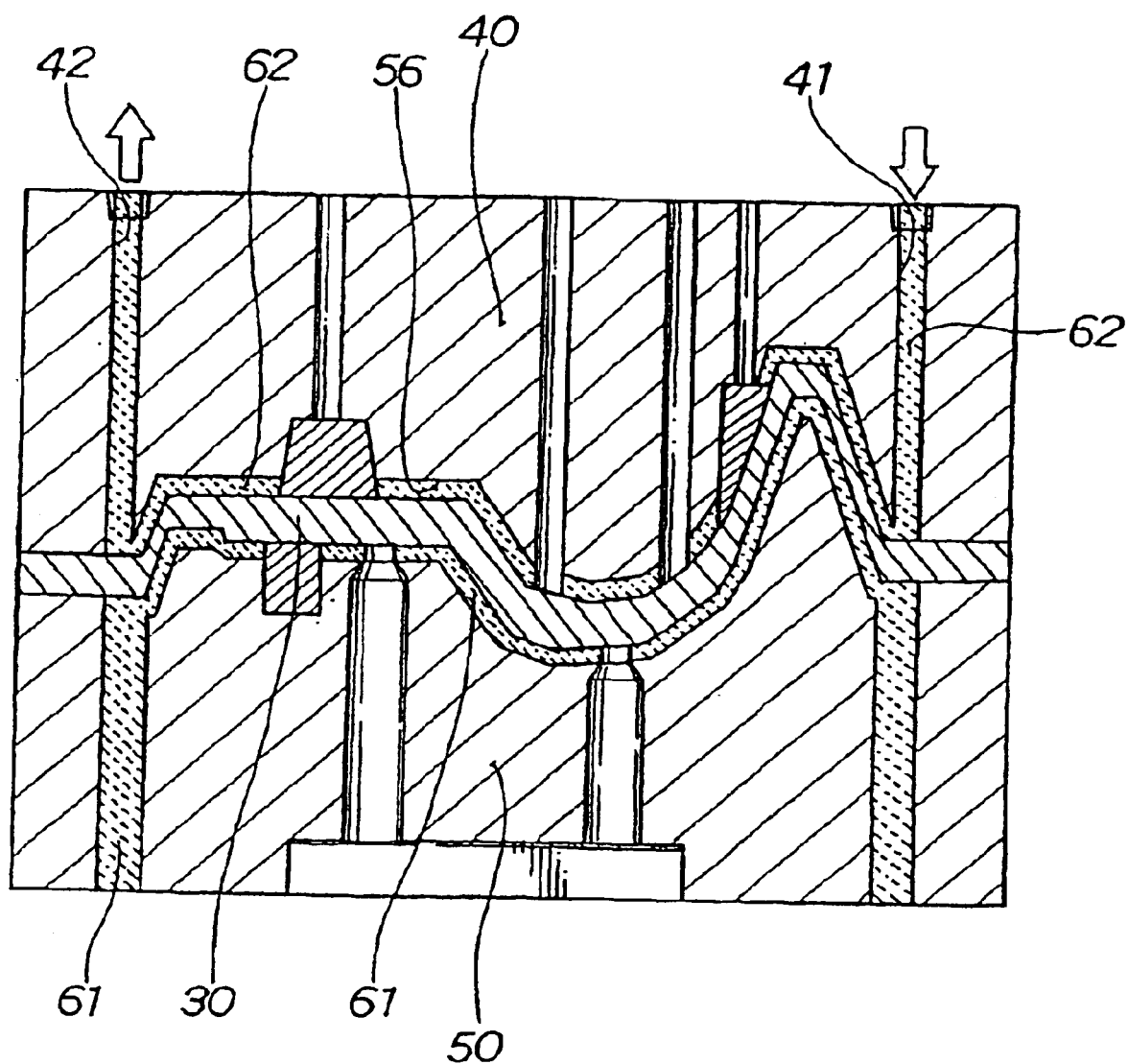
FIG. 13 is a view illustrating a resin filling step according to the present invention, in which a first resin filling space is filled with a resin as a material of a resin mold to be produced.

FIG. 13 is a view illustrating a resin filling step according to the present invention, in which the first resin filling space is filled with a resin as a material of a resin mold to be produced. In this step, a resin 62 as a material of a resin mold to be produced, which contains an epoxy resin and a powder of metal as basic components and also contains a filler as an additional component, is injected in the first resin filling space 56 from the temporary filler injection hole/resin injection hole 41 provided in the first back surface reinforcing member 40. When the resin 62 overflows from the temporary filler overflow hole/resin overflow hole 42, the injection of the resin 62 is stopped, followed by curing of the resin 62.

The powder of a metal contained in the resin 62 may be a powder of a metal such as aluminum, copper, iron, or nickel, or a powder of an alloy containing the metal as a main component.

The filler contained in the resin 61 is basically used in the form of fibers, and the material of the filler may be carbon, aramid resin, polyimide, a ceramic material, a metal material, or a material equivalent thereto.

During the above-described operation of the resin filling step, since a downward load equivalent to a total of a weight of the resin 62 injected in the first resin filling space 56 and the injection pressure is applied to the master model 30, there is a possibility that the master model 30 be deflected downwardly; however, in actual, since the back surface of the master model 30 is overall supported by the layer of the resin, 61 having been injected to fill the second resin filling space 57 and cured, the master model 30 is not deflected downwardly.

As a result, during the operation of the resin filling step, the thickness of the first resin filling space 56 does not extend, so that the thickness of a layer of the resin 62 injected in the second resin filling space 56 can be set to a specific thickness.

Figure 14:
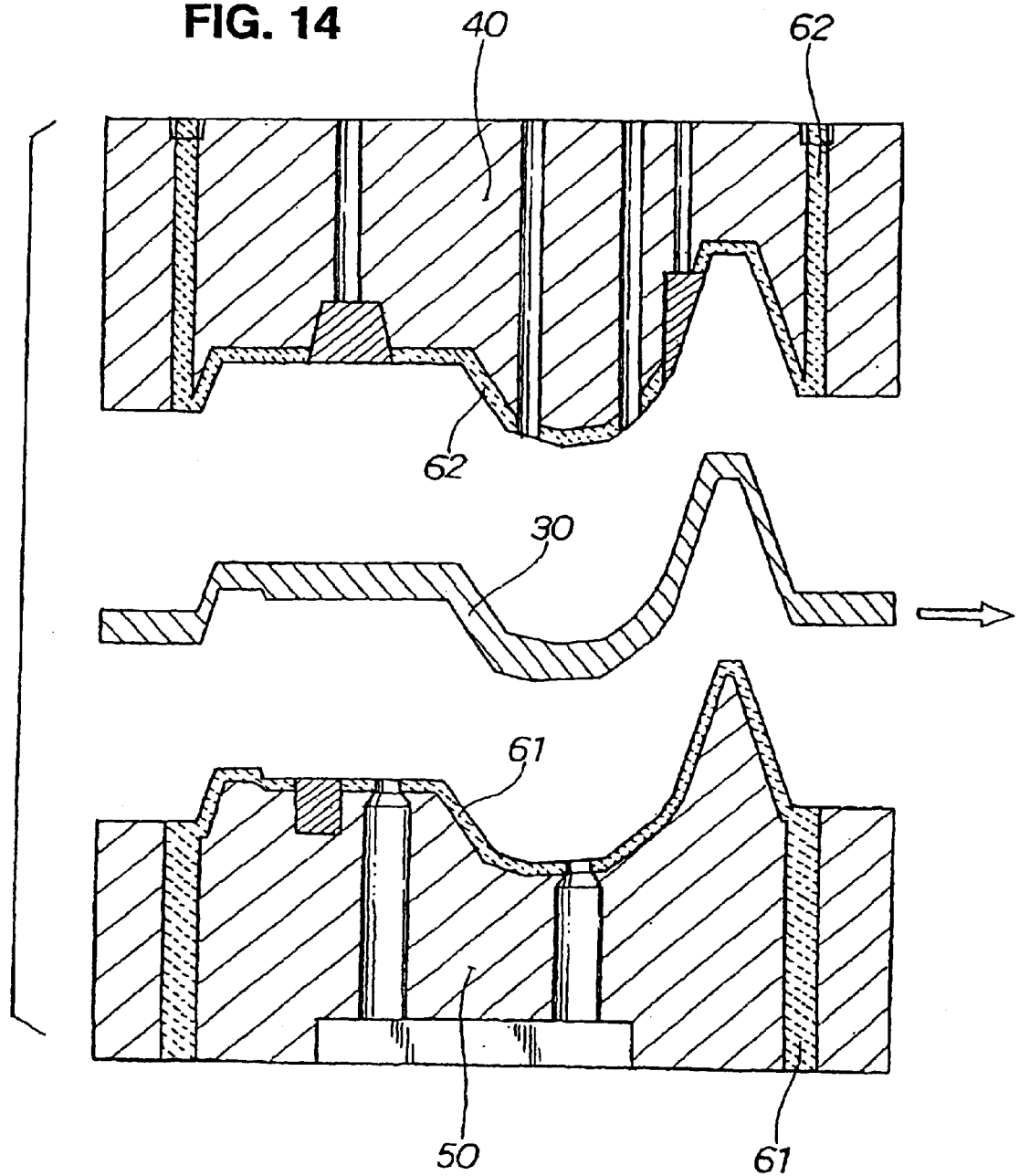
FIG. 14 is a view illustrating a master model removing step according to the present invention.

FIG. 14 is a view illustrating a master model removing step according to the present invention. In this step, the master model 30 is removed by separating the first and second back surface reinforcing members 40 and 50 from each other. After the removal of the master model 30, a reversal pattern is engraved in a surface forming plane (more specifically, a product's surface forming plane) of the layer of the resin 62 in accordance with the following procedure.

Figure 15A:
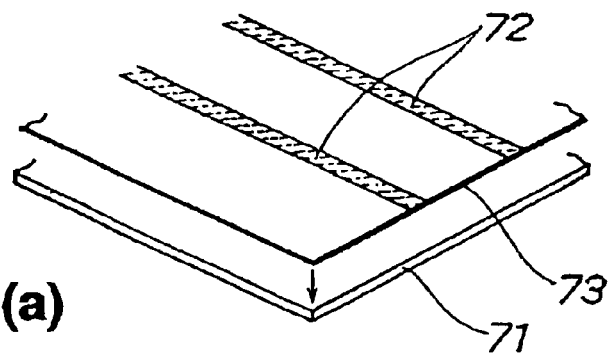
FIG. 15(a) to FIG. 15(c) illustrate a procedure for producing a mask sheet according to the present invention.
Figure 15B:
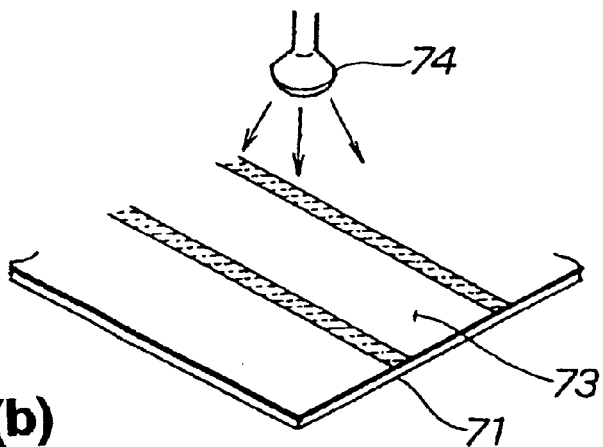
Figure 15C:
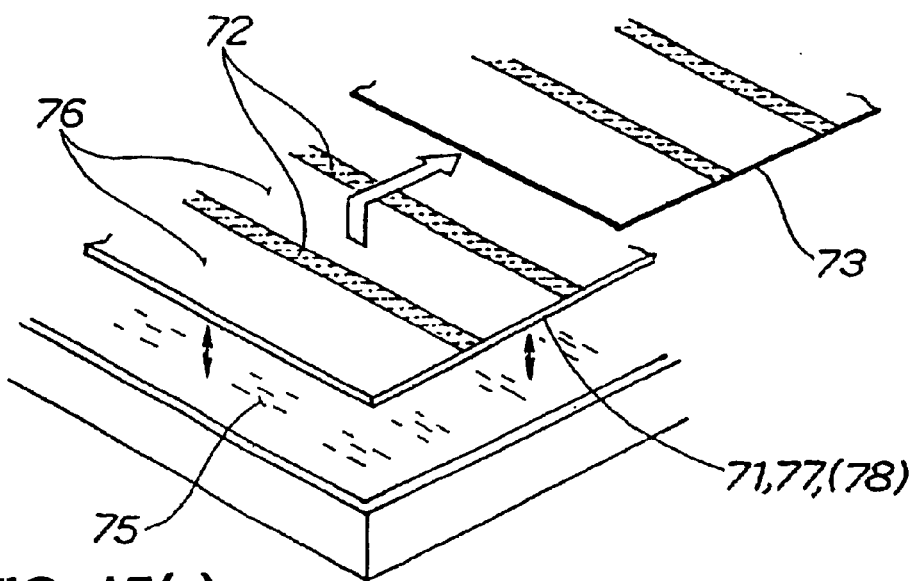

FIGS. 15(a) to 15(c) are views showing a procedure of producing a mask sheet according to the present invention.

In the step shown in FIG. 15(a), an anti-blast photosensitive resist film 71 and an original image sheet 73 are prepared. The resist film 71 has a resistance against blast particles. Lateral bar pattern portions 72 as part of a decorative design pattern are depicted on the original image sheet 73.

In the step shown in FIG. 15(b), the original image sheet 73 is overlapped to the anti-blast photosensitive resin film 71, followed by exposure using a lamp 74.

In the step shown in FIG. 15(c), the original image sheet 73 is separated from the anti-blast photosensitive resin film 71, and the anti-blast photosensitive resin film 71 is dipped in a developing solution 75. With this developing treatment, the lateral bar pattern portions 72 having a resistance against blast particles remain on the anti-blast photosensitive resist film 71, to obtain a first mask sheet 77. It is to be noted that each space between adjacent two of the lateral bar pattern portions 72 is taken as a window 76.

While not shown, a second mask sheet (78) on which longitudinal bar pattern portions remain can be obtained in the same procedure as that described above.

Figure 16A:
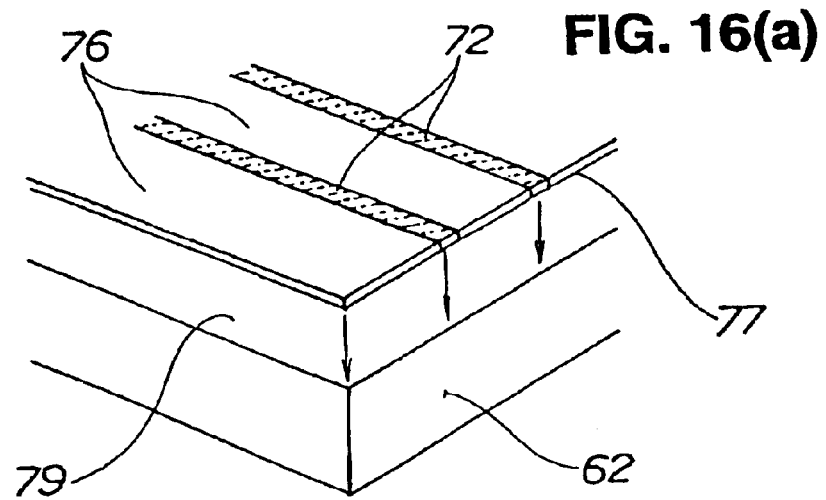
FIGS. 16(a) to 16(c) are views illustrating a primary blasting process according to the present invention.
Figure 16B:
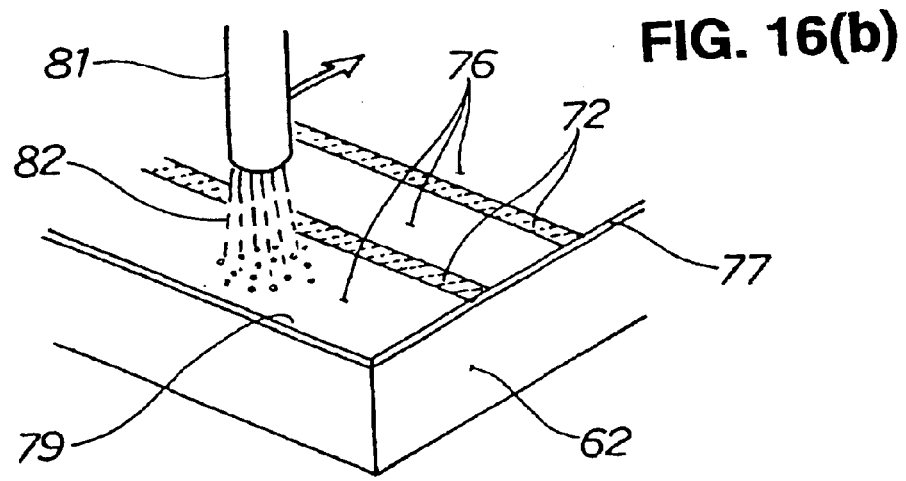
Figure 16C:
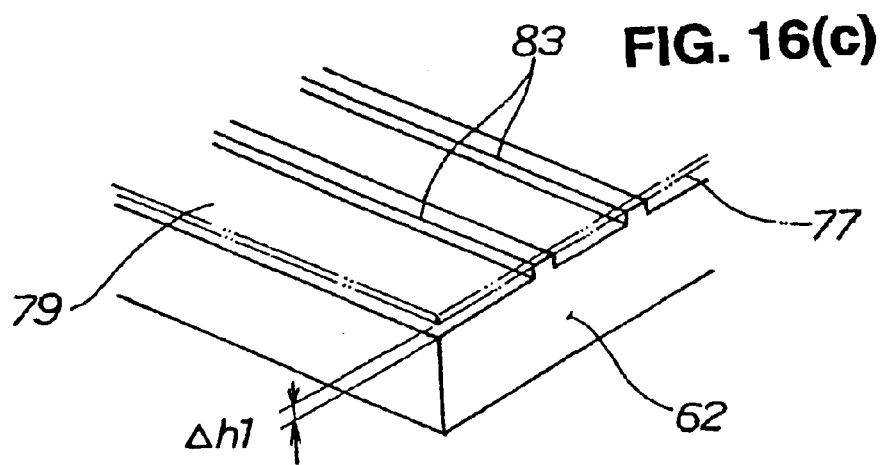

FIGS. 16(a) to 16(c) are views illustrating a primary blasting process according to the present invention.

In the step shown in FIG. 16(a), the first mask sheet 77 is stuck on a product's surface forming plane 79 of the layer of the resin 62 by means of a special adhesive.

In the step shown in FIG. 16(b), shot particles 82 (concretely, sand particles) are blasted at a high speed from a blast nozzle 81. As a result, portions, located under the windows 76 . . . , of the product's surface forming plane 79 are ground to a depth being proportional to a blasting time, and portions, located under the lateral bar pattern portions 72, of the product's surface forming plane 79 are not ground.

FIG. 16(c) shows the product's surface forming plane 79 of the layer of the resin 62 in a state after the first mask sheet 77 shown by an imaginary line is peeled. As is apparent from this figure, projecting ribs 83 each having a height of Δh1 have been formed on the product's surface forming plane 79.

Figure 17A:
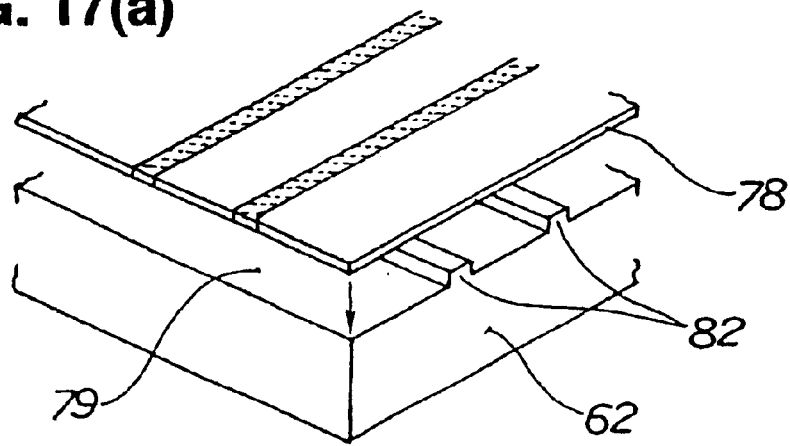
FIGS. 17(a) to 17(c) are views illustrating a secondary blasting process according to the present invention.
Figure 17B:
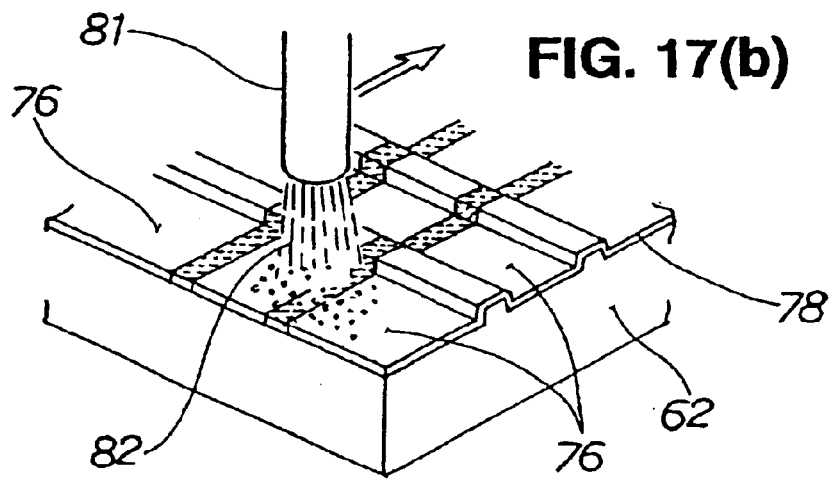
Figure 17C:
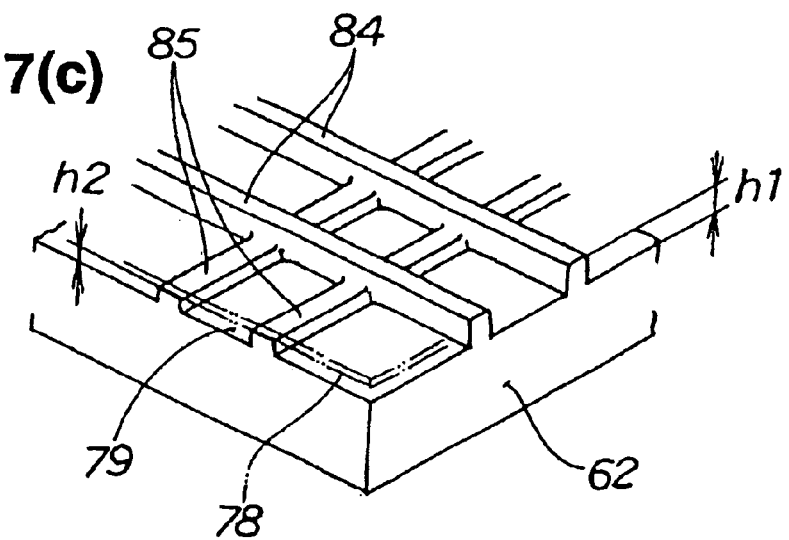

FIGS. 17(a) to 17(c) are views illustrating a secondary blasting process according to the present invention.

In the step shown in FIG. 17(a), the second mask sheet 78 is stuck on the product's surface forming plane 79 by means of a special adhesive.

In the step shown in FIG. 17(b), shot particles 82 are blasted at a high speed from the blast nozzle 81. As a result, portions, located under the windows 76 . . . , of the product's surface forming plane 79 are ground to a depth being proportional to a blasting time.

FIG. 17(c) shows the product's surface forming plane 79 of the layer of the resin 62 in a state after the second mask sheet 78 shown by an imaginary line is peeled. As is apparent from this figure, a reversal lattice pattern, composed projecting ribs 84 for deep grooves, each having a height of h1, and projecting ribs 85 for shallow grooves, each having a height h2 (h2<h1), has been formed on the product's surface forming plane 79.

Figure 18:
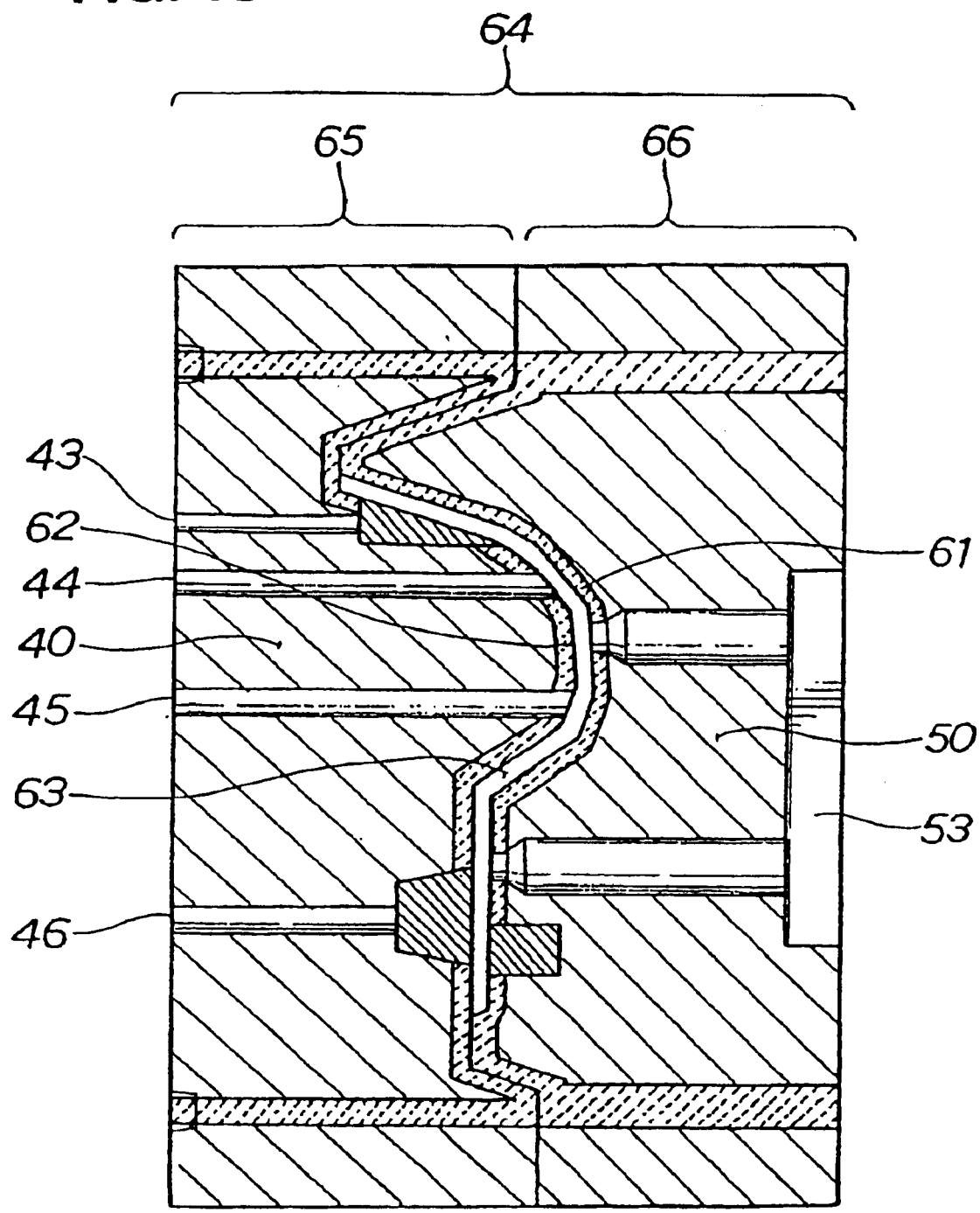
FIG. 18 is a sectional view of a resin mold produced by the method of the present invention.

FIG. 18 is a sectional view of a resin mold produced according to the present invention. A resin mold 64 is composed of a movable mold part 65 and a fixed mold part 66. The movable mold part 65 is configured such that a portion facing to a cavity 63 is made from the resin 62, and the layer of the resin 62 is reinforced by the first back surface reinforcing member 40. The fixed mold part 66 is configured such that a portion facing to the cavity 63 is made from the resin 61 and the layer of the resin 61 is reinforced by the second back surface reinforcing member 50.

Figure 20:
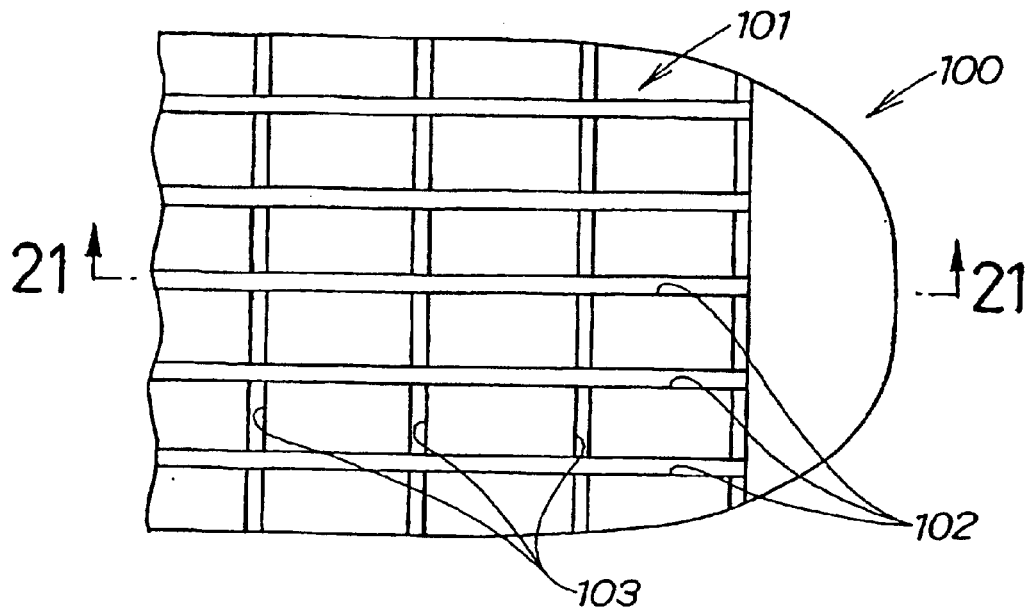
FIG. 20 is a bottom view of a sheet bottom plate.
Figure 21:
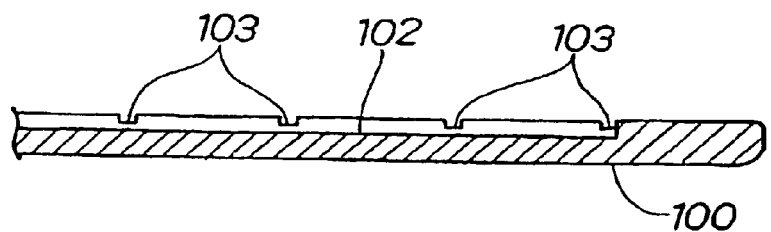
FIG. 21 is a sectional view taken on line 21—21 of FIG. 20.
Figure 22:
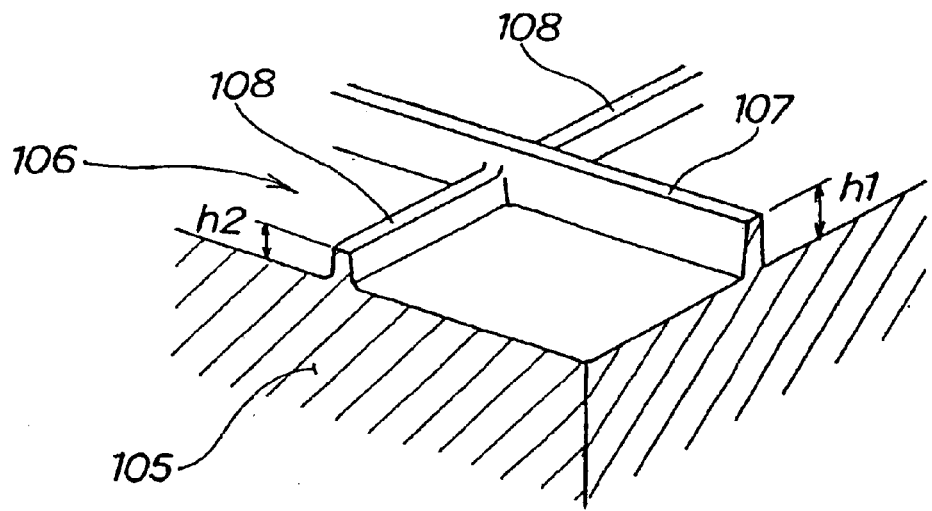
FIG. 22 is a perspective view of a product's surface forming plane of a mold.

A sheet bottom plate having the same configuration as that of the sheet bottom plate 100 shown in FIG. 20 can be obtained by injecting a molten resin in the cavity 63 via the sprue bush 53, and projecting, after solidification of the resin, the solidified resin by means of the ejector pins 43 to 46.

FIGS. 19(a) to 19(d) are views illustrating another embodiment of the surface micromachining process according to the present invention.

Figure 19A:
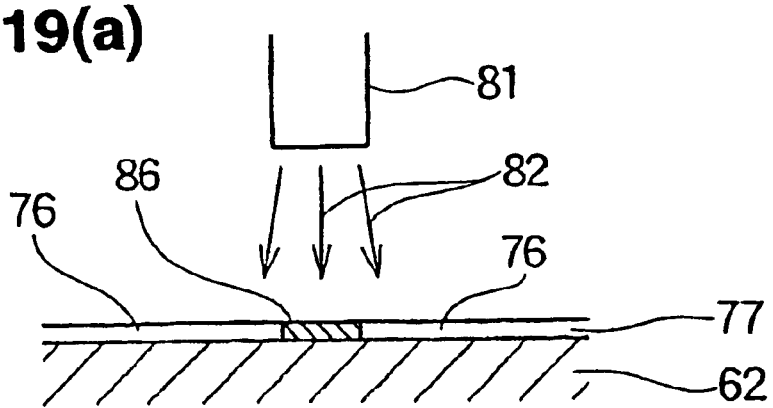
FIGS. 19(a) to 19(d) are views illustrating another embodiment of the surface micromachining process according to the present invention.

In the step shown in FIG. 19(a), a first mask sheet 77 having a large-diameter anti-blast portion 86 is stuck on the layer of the resin 62, and blast particles 82 are blasted from the blast nozzle 81 to the layer of the resin 62 via the first mask sheet 77. As a result, portions, located under portions other than the anti-blast portion 86, that is, under windows 76, of the layer of the resin 62 are ground by the blasting treatment.

Figure 19B:
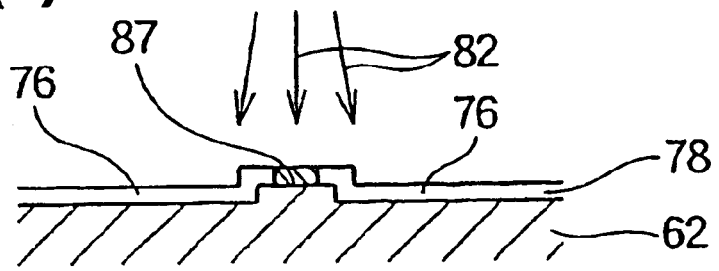

In the step shown in FIG. 19(b), a second mask sheet 78 having a middle-diameter anti-blast portion 87 is stuck on the layer of the resin 62, and blast particles 82 are blasted from the blast nozzle 81 to the layer of the resin 62 via the second mask sheet 78. As a result, portions, located under positions other than the anti-blast portion 87, that is, under windows 76 are ground by the blasting treatment.

Figure 19C:
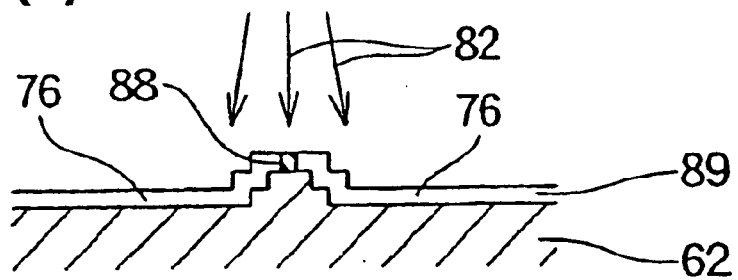

In the step shown in FIG. 19(c), a third mask sheet 89 having a small-diameter anti-blast portion 88 is stuck on the layer of the resin 62, and blast particles 82 are blasted from the blast nozzle 81 to the layer of the resin 62 via the third mask sheet 89. As a result, portions, under portions other than the anti-blast portion 88, that is, under windows 76, of the layer of the resin 62 are ground by the blasting treatment.

Figure 19D:
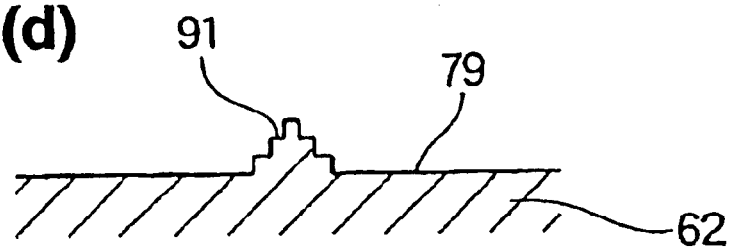

In this way, as shown in FIG. 19(d), a projecting portion 91 having an approximately semi-spherical shape can be engraved in the product's surface plane 79. A reversal em-bossed pattern or satin-like pattern can be engraved in the product's surface forming plane 79 by making use of the surface micromachining process described above.

The minimum number (kind) of mask sheets is set to two. In particular, since a finer pattern can be obtained as the number (kind) of mask sheets is increased, the number (kind) of mask sheets is preferably set to three or more.

As described above, according to the present invention, a reversal pattern with its pattern components different from each other in depth or height can be engraved in a product's surface forming plane of a resin mold by subjecting the product's surface forming plane of the resin mold to a plurality of blasting treatments using a plurality of kinds of mask sheets.

In the above-described embodiments, a reversal pattern is exemplified by a lattice pattern or a projecting pattern; however, the present invention is not limited thereto. For example, a reversal pattern corresponding to a leather-like pattern or a crimp pattern can be engraved in a product's surface forming plane of a resin mold in the same procedure as that described above.

The resin mold produced by the production method shown in FIGS. 5 to 14 has a very high accuracy, and accordingly, by subjecting the resin mold thus produced to the surface micromachining process shown in FIG. 15(a) and the later figures, it is possible to obtain an excellent resin mold on which a reversal pattern has been desirably engraved. In this way, according to the present invention characterized by combining the production method shown in FIGS. 5 to 17 with the surface micromachining process, it is possible to obtain an excellent effect capable of producing a high quality resin mold.

The mask sheet used for the present invention is not limited to a resist film but may be any other mask insofar as the mask allows blast particles to selectively reach a resin mold. For example, a so-called template composed of a thin plate made from a light metal or a resin and having windows may be used as the mask sheet.

The resist film described in the embodiments, however, is preferably used for forming a reversal pattern corresponding to a leather-like pattern. This is because, in the case of using the resist film, a fine pattern can be depicted on the basis of a photolithographic technique.

It is to be noted that the kind of a resin as a material of a resin mold in the invention described in claim 1 is not particularly limited.

INDUSTRIAL APPLICABILITY

As described above, the product's surface forming plane of the resin mold is ground by blasting blast particles to the product's surface forming plane at a high speed. Since the surface micromachining of the resin mold is performed by using the blasting process, it is possible to solve a problem that resinous part of the resin mold is melted, which problem has arisen in the case of using the NC machining process. Further, by sequentially using the first and second mask sheets different in kind in the surface micromachining process, a reversal pattern with its components different from each other in height or depth can be engraved in a product's surface forming plane of a resin mold. Thus, the present invention is particularly useful in the manufacture of resin molds.

What is claimed is:

1. A surface micromachining process for a resin mold including a layer of a resin as a material of the resin mold, which layer has a product's surface forming plane, and a back surface reinforcing member for reinforcing said resin layer, characterized in that said product's surface forming plane is micromachined by means of at least two masking/blasting treatments, said treatments comprising:

a primary blasting step of sticking a first mask sheet having a specific window on said product's surface forming, plane and blasting blast particles to said product's surface forming plane via said first mask sheet; and a secondary blasting step of peeling said first mask sheet, sticking a second mask sheet different from said first mask sheet on said product's surface forming plane, and blasting blast particles to said product's surface forming plane via said second mask sheet, wherein said resin as a material of said resin mold is an epoxy resin composition adapted for a tool, said epoxy resin composition containing at least an epoxy resin, a powder of metal, and aramid fibers.

* * * * *